United States Patent
Reed et al.

(10) Patent No.: US 6,754,982 B2
(45) Date of Patent: Jun. 29, 2004

(54) SHOE CUSHIONING SYSTEM AND RELATED METHOD OF MANUFACTURE

(75) Inventors: Karl A. Reed, Sand Lake, MI (US); Larry W. McClelland, Rockford, MI (US); Gary G. Fountain, Greenville, MI (US)

(73) Assignee: Wolverine World Wide, Inc., Rockford, MI (US)

( * ) Notice: Subject to any disclaimer, the term of this patent is extended or adjusted under 35 U.S.C. 154(b) by 92 days.

(21) Appl. No.: 09/998,774

(22) Filed: Nov. 30, 2001

(65) Prior Publication Data

US 2003/0101620 A1 Jun. 5, 2003

(51) Int. Cl.[7] .................. A43B 13/20; A43B 13/38; A43B 7/06; A43B 7/32
(52) U.S. Cl. .................. 36/30 A; 36/29; 36/30 R; 36/3 B; 36/44
(58) Field of Search ................. 36/30 A, 30 R, 36/3 B, 28, 43, 17 R, 121, 44, 29, 141, 15, 103, 3 R, 36 B, 37

(56) References Cited

U.S. PATENT DOCUMENTS

| | | | |
|---|---|---|---|
| 231,398 A | | 8/1880 | Bussey |
| 1,044,015 A | | 11/1912 | Byrne |
| 1,128,220 A | | 2/1915 | Bullard |
| 1,598,809 A | | 9/1926 | Dressel |
| 1,605,408 A | | 11/1926 | Huiskamp |
| 1,605,588 A | | 11/1926 | Huiskamp |
| 1,920,771 A | * | 8/1933 | Thoma .................. 36/36 A |
| 2,090,881 A | | 8/1937 | Wilson |
| 2,347,207 A | | 4/1944 | Margolin |
| 2,410,019 A | * | 10/1946 | Davis .................. 36/36 A |
| 2,432,533 A | | 12/1947 | Margolin |
| 2,527,414 A | | 10/1950 | Hallgren |
| 3,231,454 A | | 1/1966 | Williams |
| 3,273,265 A | * | 9/1966 | Reinert et al. .................. 36/3 B |
| 3,418,731 A | | 12/1968 | Anciaux |
| 3,426,455 A | * | 2/1969 | Drago .................. 36/43 |
| 3,834,046 A | * | 9/1974 | Fowler .................. 36/28 |
| 4,316,332 A | | 2/1982 | Giese et al. |
| 4,364,186 A | | 12/1982 | Fukuoka |
| 4,462,171 A | | 7/1984 | Whispell |
| 4,521,979 A | | 6/1985 | Blaser |

(List continued on next page.)

FOREIGN PATENT DOCUMENTS

| | | |
|---|---|---|
| DE | 61906 | 9/1891 |
| DE | 474016 | 2/1928 |
| DE | 806647 | 4/1951 |
| DE | 36358 31 | 10/1986 |
| DE | 90014 92 | 2/1990 |
| EP | 0215995 | 9/1985 |
| EP | 0320993 | 12/1988 |
| GB | 20327 61 | 10/1979 |
| NZ | 15421 | 11/1899 |

*Primary Examiner*—Anthony D. Stashick
(74) *Attorney, Agent, or Firm*—Warner Norcross & Judd LLP

(57) ABSTRACT

A footwear cushioning system including an insole and a midsole that define a chamber containing multiple, hollow, inverted, truncated cones. The insole includes a plate having a downwardly extending rib to define a recess. The midsole includes a midsole plate including an upwardly extending wall and multiple upwardly opening hollow, inverted frusto-conical cushion cells. The wall interfits within the rib, and the cushion cells abut against the insole plate. An outsole shell is direct-attached to the cushioning system with polyurethane. Preferably, the polyurethane pre-compresses the cushion cells and adds cushioning and energy return characteristics. To assemble the cushion system, an upper is stapled to the insole rib. The midsole is interfitted within the rib. The insole and midsole are heated to fuse the cushion cells to the insole. Polyurethane is poured into the outsole shell and the shell is direct attached to the upper/cushioning system.

22 Claims, 3 Drawing Sheets

U.S. PATENT DOCUMENTS

| | | | |
|---|---|---|---|
| 4,608,768 A | 9/1986 | Cavanagh | |
| 4,685,224 A | 8/1987 | Anger | |
| 4,733,483 A | 3/1988 | Lin | |
| 4,768,295 A | 9/1988 | Ito | |
| 4,782,603 A | 11/1988 | Brown | |
| 4,831,749 A | 5/1989 | Tsai | |
| 4,843,741 A | 7/1989 | Yung-Mao | |
| 4,845,863 A | 7/1989 | Yung-Mao | |
| 4,864,738 A | 9/1989 | Horovitz | |
| 4,881,328 A | 11/1989 | Yung-Mao | |
| D306,515 S | 3/1990 | Chang | |
| D306,650 S | 3/1990 | Chang | |
| 4,918,838 A | 4/1990 | Chang | |
| 4,956,927 A | 9/1990 | Misevich et al. | |
| 4,970,807 A | 11/1990 | Anderie et al. | |
| 4,979,345 A | 12/1990 | Celsi | |
| 4,999,931 A | 3/1991 | Vermeulen | |
| 5,086,574 A | 2/1992 | Bacchiocchi | |
| 5,092,060 A | 3/1992 | Frachey et al. | |
| 5,224,278 A | 7/1993 | Jeon | |
| 5,233,767 A | 8/1993 | Kramer | |
| 5,493,791 A | 2/1996 | Kramer | |
| 5,595,003 A * | 1/1997 | Snow | 36/28 |
| 5,607,749 A | 3/1997 | Strumor | |
| 5,619,809 A | 4/1997 | Sessa | |
| 5,815,949 A | 10/1998 | Sessa | |
| 5,845,418 A | 12/1998 | Chi | |
| D407,194 S | 3/1999 | Brandt et al. | |
| D407,543 S | 4/1999 | Belfanti | |
| D408,121 S | 4/1999 | Belfanti | |
| 5,890,248 A * | 4/1999 | Gee | 36/28 |
| D409,363 S | 5/1999 | Belfanti | |
| 5,915,819 A | 6/1999 | Gooding | |
| 5,918,383 A * | 7/1999 | Chee | 36/28 |
| 5,992,052 A | 11/1999 | Moretti | |
| 6,029,962 A | 2/2000 | Shorten et al. | |
| 6,041,519 A | 3/2000 | Cheng | |
| 6,076,282 A * | 6/2000 | Brue | 36/3 B |
| 6,131,310 A | 10/2000 | Fang | |
| 6,138,383 A | 10/2000 | Steinke et al. | |
| 6,209,226 B1 | 4/2001 | Squadroni | |
| 6,209,228 B1 | 4/2001 | Yang | |
| 6,216,365 B1 | 4/2001 | Cohen | |
| 6,219,939 B1 | 4/2001 | Kita et al. | |
| 6,219,940 B1 | 4/2001 | Kita | |
| 6,226,895 B1 * | 5/2001 | McClelland | 36/30 A |
| 6,266,898 B1 | 7/2001 | Cheng | |

* cited by examiner

SHOE CUSHIONING SYSTEM AND RELATED METHOD OF MANUFACTURE

BACKGROUND

The present invention relates to footwear and, more particularly, to a footwear construction and the method for making the same.

In the footwear industry, there is an ongoing effort to produce footwear including a cushioning system that provides both energy return characteristics and a high level of comfort for wearers. The need to produce such a cushioning system is particularly pronounced in the design of work, walking and athletic footwear, where reduction of fatigue and increased cushioning are primary objectives. For example, to minimize the effects of standing for long periods on hard surfaces (e.g., concrete floors) and walking on such surfaces, it is desirable to provide footwear that cushions the wearer's foot from the hard surface and also returns energy to the wearer during walking or running.

Conventionally, energy return and cushioning have been competing interests. Efforts to improve cushioning typically reduce energy return. One shoe sole assembly used to improve cushioning, disclosed in U.S. Pat. No. 5,233,767 to Kramer, includes multiple, hollow, uniform, vertical columns, which compress and bulge to provide shock absorption and, therefore, cushioning. Although the use of the uniform, vertical columns increases cushioning, energy return is sacrificed because the uniform, vertical columns may not rapidly snap back from the bulged shape after compression. In another footwear construction, disclosed in U.S. Pat. No. 6,131,310 to Fang, a flanged insole is positioned over an outsole including solid, cylindrical separating posts, but the insole is gapped a distance above each post. This structure increases cushioning due to the compression of the separating posts, however, energy return is lost because the columnar cylindrical posts may not rapidly snap back into pre-compression shape. Moreover, after the insole separates from the separating posts when weight is removed from the shoe, the separating posts cannot generate return energy to the insole due to the physical separation.

Although the cushioning systems of the prior art provide cushioning, there remains a long felt and unmet need for a footwear construction that provides a desired level of cushioning as well as energy return.

SUMMARY OF THE INVENTION

The aforementioned problems are overcome in the present invention which provides multiple, inverted, frusto-conical cushion cells disposed between an insole and midsole. The cushion cells are preferably mounted to or integral with the midsole. The insole preferably includes a rib extending around it to form a recess into which the midsole is nested to form an enclosed cushion system.

In a preferred embodiment, the rib of the insole is secured to an upper. An outsole shell, filled with polyurethane, is direct-attached to the insole and/or the upper. Preferably, the polyurethane exerts a pressure against the midsole, forcing the cushion cells firmly upward against the insole. The insole also may include multiple vent holes, each uniquely associated with one of the cushion cells to provide a vent for air to escape the cells during compression and enhance the shock-absorbing characteristic of the cells.

In another preferred embodiment, multiple cushion cells are positioned at the forefoot of the cushioning system and aligned with the metatarsal heel of a wearer. Another cushion cell is disposed under the heel of the cushioning system. This cushion cell is concentrically disposed in a vertical, cylindrical wall that extends from the midsole base.

The cushioning system of the present invention is preferably manufactured using the general steps of (a) securing an upper to an insole, the insole including an insole base formed in the shape of a foot and a rib that define a recess and (b) positioning a midsole in the recess where the midsole includes a midsole base and multiple upwardly opening, truncated cones integral with the midsole base, so that the largest diameter portion of the truncated cones abuts the insole base.

Footwear incorporating the cushioning system of the present invention is preferably manufactured using the general steps of (a) securing an upper to an insole where the insole includes an insole base and a rib that together define a recess; (b) positioning a midsole in the recess, the midsole including a wall extending from the midsole and multiple, hollow, inverted truncated cones and (c) securing a sole to at least one of the upper, the insole, and the midsole.

The present invention provides a unique footwear construction having a previously unachieved combination of cushioning and energy return. The interaction of the cushion cells sandwiched between the insole and midsole provide a unique structure that has the ability to both (1) compress and provide cushioning and (2) provide maximized energy return upon decompression of the cells. Furthermore, when the cushioning system is incorporated into a shoe and the filler material pre-loads the cushion cells, additional energy return is available from those cells because their upwardly opening walls are slightly pre-compressed.

These and other objects, advantages and features of the invention will be more readily understood and appreciated by reference to the detailed description of the preferred embodiments and the drawings.

DETAILED DESCRIPTION OF THE PREFERRED EMBODIMENTS

Figure 1:
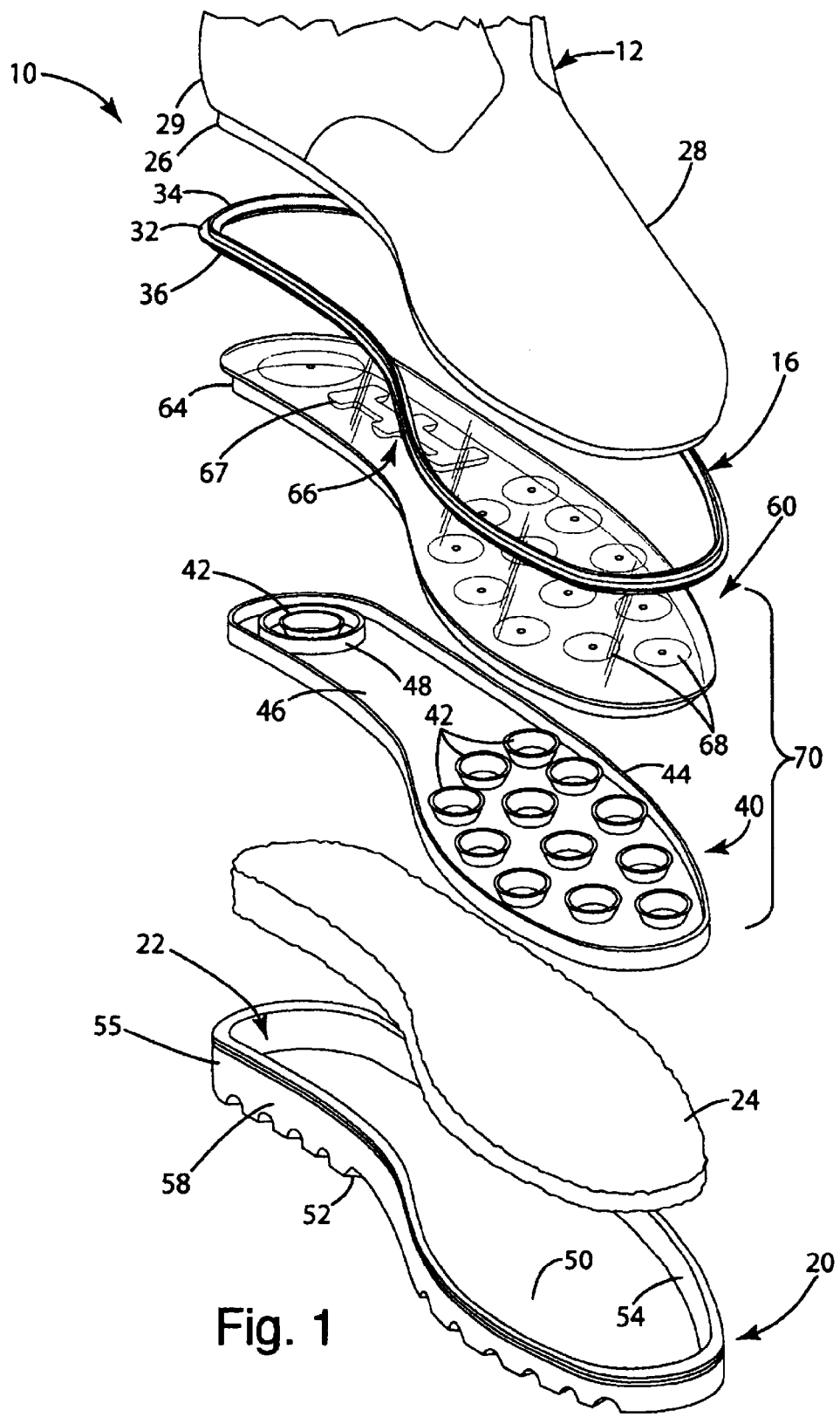
FIG. 1 is an exploded perspective view of an article of footwear incorporating the cushioning system.
Figure 2:
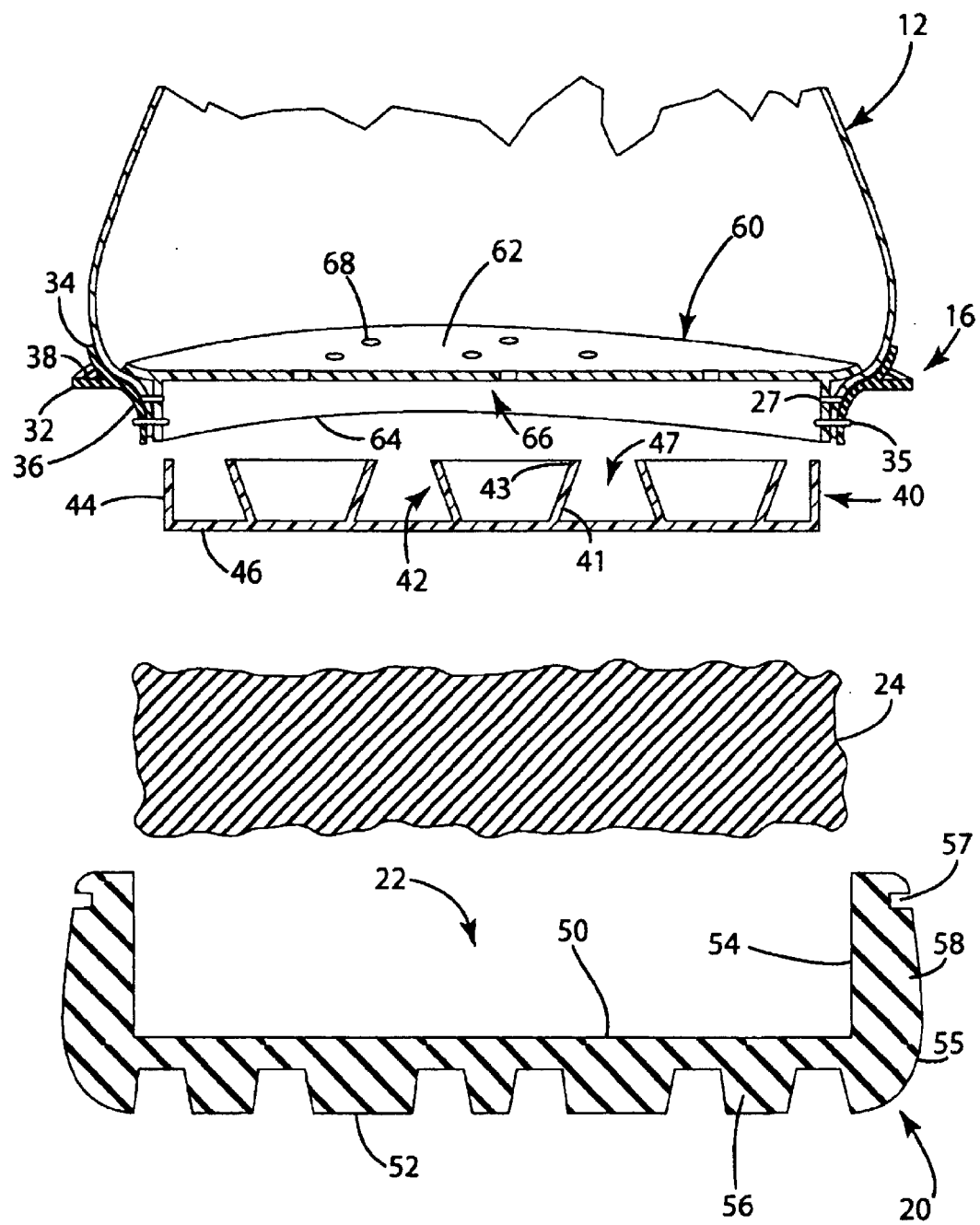
FIG. 2 is an exploded section view of the article of footwear with an upper attached to an insole.
Figure 3:
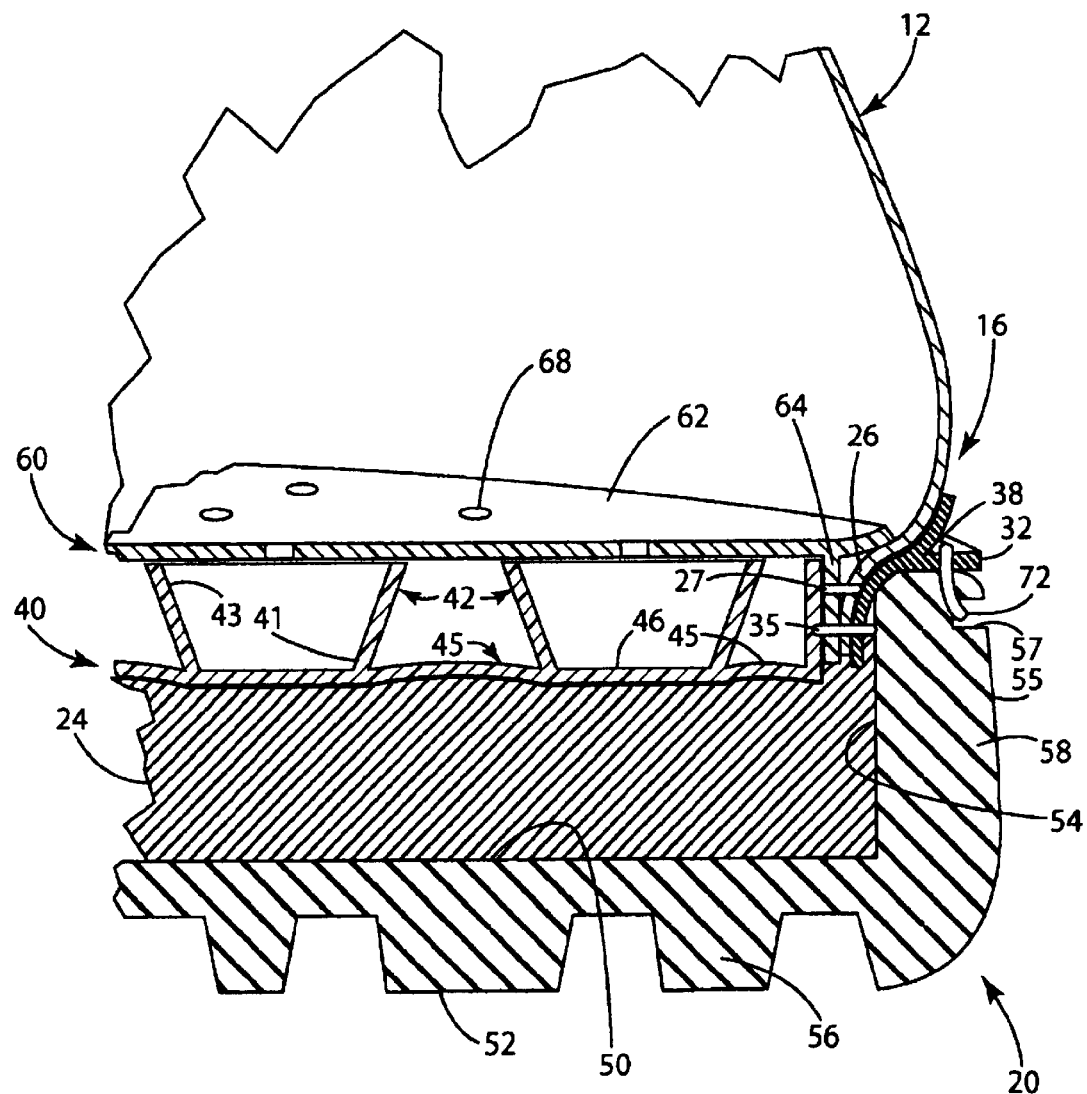
FIG. 3 is a sectional view of the article of footwear incorporating the cushion system.

A boot constructed in accordance with a preferred embodiment of the present invention is shown in FIGS. 1–3 and generally designated 10. For purposes of disclosure, the present invention described in connection with a conventional three-quarter height boot. As will be appreciated, the present invention is well suited for use with other types of soled footwear.

Generally, the boot 10 includes an upper 12 that is secured to the outsole shell 20 by a welt 16 and insole rib 64. The outsole shell 20 defines a void 22 that contains a filling material 24, such as polyurethane, polyvinyl chloride, or thermo plastic rubber. The welt 16 is attached to and interconnects the upper 12, the insole 60 and the outside shell 20.

The upper 12 is conventional and will only be described briefly here. Upper 12 includes a quarter 29 and a vamp 28. The upper 12 terminates in the lower peripheral edge 26, which is attached to the outsole shell 20 through the welt 16 as described in detail below. The upper 12 is preferably manufactured from leather, canvas, nylon or other suitable materials, and may include a liner (not shown) or other conventional accessories.

The welt 16 extends entirely around the boot 10 to interconnect the upper 12 and the outsole shell 20 as best shown in FIG. 3. The welt 16 is generally conventional, including a generally horizontal base portion 32 with an upwardly extending upper rib 34 located toward the center of the base portion 32 and downwardly extending lower rib 36 located at the inner edge of the base portion 32. The outer surface of the upper rib 34 is rounded to, among other things, reduce the profile of the welt 16. The lower rib 36 is generally rectangular in cross section and is of an sufficient size to receive staples, stitching or other fastening elements. The horizontal base portion 32 defines an upwardly opening stitch grove 38 that extends around the welt 16 near its outer edge. The stitch grove 38 is adapted to receive the stitching 72 that interconnects the outsole shell 14 and welt 16 as described in more detail below. Optionally, the stitching 72 and stitch grove 38 may be absent from the footwear as desired.

As noted above, the cushioning system generally includes the insole 60 and midsole 40 and cooperating filling material 24, which may be polyurethane, polyvinyl chloride or thermo plastic rubber. If desired, the cushioning system may also include a shank 67 incorporated into the insole 60.

The insole 60 is includes an insole base 62 with a downwardly extending rib 64. The insole base 62 is generally planar and corresponds in shape with an outline of a foot. The insole rib 64 extends downwardly and around the insole base 62 at or near its outer edge or periphery. The insole rib 64 and insole base 62 cooperate to form a downwardly opening recess 66. The insole rib is of sufficient size to receive staples, stitching or other fastening elements.

Preferably, the insole base 62 defines a plurality of holes 68, each being uniquely associated with and preferably concentrically positioned over a corresponding cushion cell 42 described further below. Optionally as desired, the holes 68 may be absent from the insole 60. Additionally, a reinforcement shank 67 made from plastic, metal or other materials may be secured to or integral with the insole to add rigidity to the shoe 10. Among other things, this permits control of the amount of pre-compression applied to the cushion cells.

The midsole 40 generally includes a midsole base 46, upwardly extending wall 44 and cushion cells 42. The midsole base 46 is generally planar and corresponds in shape with the outline of the foot. The midsole wall 44 extends upwardly from and around the midsole base 46 at or near its outer edge. The midsole wall 44 preferably extends an equal distance from the midsole base 46 as the cushion cells 42. Together, the wall 44 and midsole base 46 form a cavity 47 in which the cushion cells 42 are disposed. The cells 42 are preferably integrally molded or secured to the midsole base 46. The cushion cells 42 are essentially hollow and are of an upwardly opening frusto-conical shape. Described another way, the cushion cells 42 are in the shape of hollow, inverted, truncated cones, tapered so that the cell base 41 is of smaller diameter than the upper cell portion 43. Although the cushion cells 42 are preferably an inverted, truncated cone, they may be of virtually any similar tapered shape, such as cylindrical (not shown) or hemispherical (not shown).

With particular reference to FIG. 3, the midsole wall 44 fits within the insole rib 64 to define a cavity therein. The cushion cells 42 extend from the midsole base 46 to abut against the insole base 62. Preferably, the upper portion 43 of the cushion cells 42 are heat-fused to the midsole base 62 so that the insole/midsole and related components form a cushion layer 70. The elements of the cushion layer preferably are constructed of a semi-supple material, for example, rubber or synthetic elastomers.

Preferably, the cushion cells are positioned on the midsole base 46 aligned with the bones in the feet, particularly the metatarsal head. As shown in FIG. 1, a single cushion cell 42 may be disposed on the midsole base 46 in the area corresponding to the heel of a wearer. Optionally, a vertical wall 48 may be positioned concentrically around the cushion cell to add additional support and cushion in the heel. As will be appreciated, additional cushion cells may be disposed in the heel. Furthermore, the cushion cells may be of varying sizes and located in different portions of the midsole as desired.

The outsole shell 20 is preferably manufactured from a relatively hard rubber or other sufficiently durable and wear-resistant material. The outsole shell 20 generally includes a bottom 56 and an peripheral wall 58 extending upwardly from the periphery of the bottom 56. The bottom 56 includes an inner surface 50 and an outer surface 52 which forms the wear surface of the outsole shell 20. The outer surface 52 may, as desired, be contoured to define the desired heel and tread patterns. The outer surface 52 may also be textured as desired to improve the traction and esthetic appeal of the footwear. The peripheral wall 58 also includes an inner surface 54 and an outer surface 55. The outer surface 55 of the peripheral wall 58 may be contoured or textured to provide the desired visual appearance. The outer surface 55 also defines and an outwardly opening stitch groove 57, which extends around the peripheral wall 58 near its upper edge. The stitch groove 57 is generally rectangular in cross section, however, any desired cross section may be used. The peripheral wall 58 may include a plurality of protrusions (not shown) that extend inwardly to interlock with filler 24 and improve the interconnection of the various sole components.

The filling material 24 is preferably conventional polyurethane foam, however, other materials such as polyvinyl chloride and thermo plastic rubber may be used as well. The inner surface 50 of the outsole shell 20 and the inner surface 54 of the peripheral wall 58 cooperate to define a void 22 that receives the filling material 24. As described below, the filling material 24 is preferably pour molded into the void 22 during assembly of the footwear 10 such that it expands to flow around and interlock the insole base 62 and upward around the insole rib 64 and partially adjacent the midsole wall 44 to interlock to the insole and midsole and the outsole shell 20.

Preferably, as best depicted in FIG. 3, upon expansion, the polyurethane presses upward against the midsole base 46 thereby pre-compressing the cushion cells 42 between the insole base 62 and the midsole base 46. As can also be seen in FIG. 3, the areas around the cushion cells 42 upwardly bow to a slight degree because of the expanded polyurethane 24. The density and precise chemical makeup of the polyurethane will vary from application to application depending on a variety of factors, including the size of the void 22 and the desired cushioning and flexibility characteristics. Among other things, this permits control of the amount of pre-compression applied to the cushion cells.

Manufacture and Assembly

The boot 10 is manufactured using generally conventional machinery. More specifically, the upper 12 is manufactured using generally conventional techniques and apparatus. The desired upper material (not shown) is cut to form the various elements of the upper, including the vamp 28 and quarter 29. The elements of the upper are then fitted and sewn together using conventional methods and apparatus. A lining (not shown) may be sewn within the upper during the fitting step. The fitted upper 12 is stretched over a last (not shown). The insole 60 is placed within the lower peripheral edge 26 of the upper using conventional apparatus and techniques. The insole rib 64 is stapled directly to the lower peripheral edge 26 with staples 27. Alternatively, insole rib 64 can be sewn or glued to the upper 12 in a conventional manner.

The welt 16 is manufactured using conventional techniques and apparatus. For example, the welt 16 can be extruded from hard durable rubber. Once the upper 12 is lasted to the insole 60, the welt is attached to the upper 12 and insole 18. Specifically, lower welt rib 36 is stitched around the peripheral edge 26 of the upper 12 and the insole 18 using conventional apparatus and techniques. This rib stitch 35 preferably extends through the lower welt rib 36, the lower peripheral edge 26 of the upper 12, and the insole rib 64. If desired, a filler (not shown), shank (not shown) or other conventional sole component can be cemented or integrally incorporated into the bottom surface of the insole base 62 using conventional adhesive, cementing or fusing techniques.

The midsole 40 is manufactured using conventional techniques and apparatus. The outsole shell 40 is preferably injection or pour molded to form a supple yet durable upper using conventional molding apparatus. The midsole 40 can, however, be manufactured from other durable and supple materials. Preferably, the cushion cells 42, vertical wall 44 and vertical concentric wall 48 (if used) are all formed during the molding operation to form an integral part of the midsole 40. Optionally, however, each cushion cell may be cemented or otherwise secured to the insole base 46 as desired. Each of the cushion cells preferably is molded so that they align with and generally correspond to the metatarsal head and heel of a wearer's foot. As will be appreciated, the cushion cells 42 may be distributed in any pattern as desired depending on the intended use of the footwear.

A manufactured midsole 40 is positioned within the recess 66 of the insole 60. Preferably, the midsole wall 44 interfits within the insole rib 64 with low tolerances therebetween. The upper portions 43 of the cushion cells 42 also preferably abut against the insole base 62 when the midsole 40 is positioned within the recess 66. The cushion cells also preferably align and are uniquely associated with each of the plurality of holes 68 in the insole 60. After the midsole 40 is interfitted in the insole 60, the components thereof are integrally fused together using heat application. Preferably, the two materials are constructed of like material that bonds to one another with heat, for example, rubber, or synthetic elastomers. Optionally, the uppermost portions of the cushion cells 42 and, as desired, the midsole wall 44 may be cemented to the insole base 62 and insole rib 64 as desired. In this manner, a completed cushioning system element 70 is formed. As will be appreciated, the midsole and outsole may be molded as a single piece (not shown) wherein the insole plate 62 is secured to the midsole base 46 via the cushion cells 42 and a single outer peripheral wall (not shown). Optionally, a cushioning rib (not shown) may extend below this midsole base 46 to facilitate fastening to the peripheral edge 26 of the upper.

In the preferred embodiment of FIGS. 1–3, the outsole shell 20 is manufactured using conventional techniques and apparatus. The outsole shell 20 is preferably injection or pour molded to form a hard, durable rubber using conventional molding apparatus. The outsole shell 20 can, however, be manufactured from other durable outsole materials. The stitch groove 57, void 22 and desired tread pattern are formed during the molding operation as an integral part of the outsole shell 20.

After the outsole shell is manufactured, it is attached to the upper/welt/cushioning system combination. Machinery used preferably includes a die (not shown) that facilitates assembly of the boot 10. The die includes a top half, which receives the upper/welt/cushioning system combination and a bottom half, which receives the outsole shell 20. Die halves are designed such that they can be closed to fold the upper/welt/cushioning system combination in appropriate alignment with the outsole shell 20. The die holds the bottom surface of the welt 16 against the top surface of the peripheral wall 58 firmly enough to prevent expanding polyurethane from entering the seam and/or exiting out over the sides of the peripheral wall 58.

After the outsole shell 20 and the upper/welt/cushioning system combination are inserted in the appropriate die halves, the appropriate volume of a filler material, preferably polyurethane foam, is poured into void 22. As the polyurethane foam is poured into the void 22, it begins to expand and cure. The dies immediately close, bringing the upper/welt/cushioning system combination in a proper alignment with the outsole shell 20. The polyurethane foam continues to expand and cure, causing it to surround, trap and interlock the various elements, including the midsole and the welt. By virtue of its expansion, the polyurethane foam flows into the seams between the welt 16, upper 12, insole rib 64 and midsole wall 44 and into the stitch holes in the respective elements. As a result, the polyurethane filling material 24 secures the outsole shell to the upper/welt/cushioning system.

Preferably, enough polyurethane foam is disposed in the void 22 so that when it expands and cures against the cushioning system 70, in particular, the midsole base 46, it pushes upward against the base, causing slight upward deformation 45 as depicted in FIG. 3 around each of the cushion cells 42. In turn, this causes the cells to be slightly pre-compressed, which adds to the cushioning and energy return characteristics of the cushioning system.

Polyurethane foam is generally well-known in the footwear industry and, therefore, will not be described in detail. Suffice it to say that polyurethane foam is typically derived from combining a polyether, such as polypropylene glycol, with diisocyanate in the presence of water and a catalyst. The resulting chemical reaction produces carbon dioxide which causes the polymer to foam. The rigidity and flexibility of the polyurethane foam can be varied from application to application as desired using a variety of well-known techniques, such as by adjusting the type and a portion amount of the reactants. In addition, the rigidity and flexibility of the polyurethane foam can be varied by adjusting the volume of polyurethane foam deposited in the void 22.

After the filling material 24 is sufficiently cured, the welt optionally is stitched directly to the outsole shell 20 using conventional machinery. The outsole stitch 72 extends around the periphery of the boot 10 through the welt 16 at stitch groove 38 in the outsole shell 20 at stitch groove 57. The stitches 72 are recessed in the grooves 38 and 57 so that they are protected from abrasion and wear. Preferably, the outsole stitch 72 does not pass through the filling material 24.

Finally, a number of conventional finishing operations are performed on the boot 10. For example, the edge of the sole 14 is trimmed and shaped; the upper 12 is cleaned, polished and treated as appropriate and necessary; and the laces are inserted in the eyelets.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. A cushioning system for footwear comprising:
an insole including an insole plate defining a periphery and a first wall extending downwardly from said insole plate to define a first recess;
a midsole including a midsole plate, a second wall extending upwardly from said midsole plate to define a second recess and a plurality of independent cushion cells integral with said midsole plate and located within said second recess, each of said cells bound on all sides by at least one cell wall and formed in the shape of hollow, truncated cones extending in an upwardly opening manner from said midsole plate, each cell wall of each cell separate and distal from the second wall, wherein said midsole is at least partially interfitted in said first recess so that said insole plate abuts said plurality of cushion cells.

2. The cushioning system of claim 1 wherein a plurality of said cushion cells are aligned with the metatarsal head of a foot of a wearer of footwear including the cushioning system.

3. The cushioning system of claim 2 wherein at least one of said cushion cells is aligned with a heel of the foot of the wearer.

4. The cushioning system of claim 3 wherein a support flange is disposed concentrically about said cushion cell aligned with the heel of the foot of the wearer.

5. The cushioning system of claim 1 wherein said cushion cells, insole and midsole are constructed of at least one of rubber and synthetic elastomers.

6. The cushioning system of claim 1 wherein the insole plate defines a plurality of vent holes, each of which is uniquely associated with each of the plurality of cushion cells.

7. The cushioning system of claim 1 wherein the insole is attached to an outsole shell to define a void between the midsole plate and the outsole shell.

8. The cushioning system of claim 7 wherein the void is filled with a filler chosen from polyurethane, polyvinyl chloride and thermo plastic rubber, wherein the filler is direct-attached to the insole plate and the outsole shell and wherein the filler is cured in-situ within the void.

9. The cushioning system of claim 8 wherein the filler material presses against the midsole plate so that the cushion cells are firmly abutted against said insole plate to pre-load the cushion cells.

10. The cushioning system of claim 9 wherein said midsole plate deflects upwardly between each of said plurality of cushion cells.

11. The cushioning system of claim 8 wherein said first wall and said second wall are positioned adjacent one another to prevent the filler entering the first and second recesses.

12. An article of footwear comprising:
an upper including a lower peripheral edge;
an insole including a first plate and a rib extending from said first plate defining a first recess, said rib secured to said lower peripheral edge;
an insert including a second plate, a flange extending from said second plate to form a second recess and a plurality of hollow, upwardly and outwardly tapering members extending from said second plate at least partially within said second recess, said insert positioned within said first recess, said members separate and distal from said flange; and
a sole having a filler material and an outsole shell, said filler material direct-attached to at least one of said upper, said insole and said insert, said outsole shell defining a void filled with said filler material.

13. The footwear of claim 12 wherein said first plate defines a plurality of apertures, each corresponding to at least one of said plurality of hollow, upwardly and outwardly tapering members.

14. The footwear of claim 13 wherein said filler material is bonded directly to said insert and said outsole shell, said filler material forming a majority of said sole.

15. The footwear of claim 11 wherein said first plate includes a shank to provide support for the foot of a wearer.

16. The footwear of claim 11 wherein the plurality of hollow, upwardly and outwardly tapering members align with metatarsal bones of the foot of a user and wherein at least one of the members corresponds to the heel of a wearer.

17. The footwear of claim 11 wherein each of the plurality of hollow, upwardly and outwardly tapering members includes a base portion, which is integrally molded with the second plate, and a contact portion, distal from said base portion, wherein said contact portion abuts against said first plate when said insert is positioned within said first recess.

18. A footwear cushion system comprising:
an insole;
a midsole, said insole and midsole cooperating to define a cavity;
a plurality of hollow, inverted, frusto-conical cells disposed in said cavity, each of said cells independent and separate from other cells so that at least a portion of the cavity is also defined between each of said cells;
an outsole shell secured to at least one of said insole and midsole to define an outsole chamber; and
an expandable filling material cured in-situ within said chamber whereby said plurality of hollow, inverted frusto-conical cells are pre-loaded by being pre-compressed between sole and midsole within said cavity.

19. The footwear cushion system of claim 18 wherein said cushion cells are integrally fused to said insole and midsole.

20. The footwear cushion system of claim 18 wherein one from said plurality of cushion cells is disposed in a heel portion of the insole, and wherein a cylindrical wall is concentrically disposed around said one cushion cell.

21. The footwear cushion system of claim 20 wherein said insole includes an integral shank to add rigidity to the footwear cushion system.

22. The footwear cushion system of claim 21 wherein the insole defines a plurality of air vents, each uniquely associated with one of said plurality of cushion cells.

* * * * *